United States Patent
Ogawa et al.

(10) Patent No.: US 8,814,028 B2
(45) Date of Patent: Aug. 26, 2014

(54) METHOD OF REMOVING BULGING PORTIONS TO MANUFACTURE A FRICTION WELDED PROPELLER SHAFT

(75) Inventors: Tomoki Ogawa, Kariya (JP); Satoshi Araki, Osaka (JP); Yukinobu Nishiyama, Kariya (JP); Yoshinori Satou, Takahama (JP); Kazunori Aoki, Toyoake (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/551,330

(22) Filed: Jul. 17, 2012

(65) Prior Publication Data

US 2012/0283031 A1 Nov. 8, 2012

Related U.S. Application Data

(62) Division of application No. 12/959,660, filed on Dec. 3, 2010, now Pat. No. 8,409,019.

(30) Foreign Application Priority Data

Dec. 10, 2009 (JP) ................................. 2009-280782

(51) Int. Cl.
*B23K 20/12* (2006.01)
*F16C 3/02* (2006.01)
*F16C 3/03* (2006.01)

(52) U.S. Cl.
CPC ............. *F16C 3/023* (2013.01); *F16C 2326/06* (2013.01); *F16C 3/03* (2013.01)
USPC ..................................................... 228/114.5

(58) Field of Classification Search
USPC ............. 228/112.1–114.5, 2.1–2.3, 159, 160, 228/73.5
See application file for complete search history.

(56) References Cited

U.S. PATENT DOCUMENTS 2,959,850 A * 11/1960 Deringer .......................... 29/458
3,226,817 A * 1/1966 Simborg et al. ................. 29/430

(Continued)

FOREIGN PATENT DOCUMENTS

CN 1732104 A 2/2006
CN 1796811 A 7/2006

(Continued)

OTHER PUBLICATIONS

Apr. 24, 2014 Notification of First Examination Opinions issued in Chinese Patent Application No. 201010578090.4 (with English translation).

*Primary Examiner* — Kiley Stoner
*Assistant Examiner* — Carlos Gamino
(74) *Attorney, Agent, or Firm* — Oliff PLC

(57) ABSTRACT

A propeller shaft includes a first shaft having a yoke at one end, a second shaft slidably connected to the other end of the first shaft, and a surface treated member which is arranged at a connecting portion, at which the first shaft and the second shaft are connected to each other, and to which surface treatment for improving slidability of the second shaft with respect to the first shaft is applied. The surface treated member is formed by a substrate which is separate from the first shaft and the second shaft and to which the surface treatment has been applied. The surface treated member is arranged at the connecting portion, at which the first shaft and the second shaft are connected to each other, after the surface treatment is applied.

2 Claims, 7 Drawing Sheets

(56) References Cited

U.S. PATENT DOCUMENTS

| | | | |
|---|---|---|---|
| 3,400,558 A | 9/1968 | Haines | |
| 3,954,215 A * | 5/1976 | Takagi et al. | 228/2.3 |
| 4,414,046 A * | 11/1983 | Palmer | 156/73.5 |
| 4,445,265 A * | 5/1984 | Olson et al. | 29/447 |
| 5,027,996 A * | 7/1991 | Fefeu et al. | 228/114.5 |
| 5,088,638 A * | 2/1992 | Karaev et al. | 228/112.1 |
| 5,213,250 A * | 5/1993 | Simon | 228/114 |
| 5,832,607 A | 11/1998 | Booy | |
| 5,858,142 A * | 1/1999 | Tully et al. | 156/73.5 |
| 6,065,813 A * | 5/2000 | Fett et al. | 301/124.1 |
| 6,223,619 B1 | 5/2001 | Shibata et al. | |
| 6,378,754 B2 * | 4/2002 | Aota et al. | 228/112.1 |
| 7,090,113 B2 * | 8/2006 | Carrier et al. | 228/113 |
| 7,488,257 B1 | 2/2009 | Booker et al. | |
| 7,963,852 B2 | 6/2011 | Ando et al. | |
| 2002/0020733 A1 * | 2/2002 | Hirose et al. | 228/114.5 |
| 2006/0039747 A1 | 2/2006 | Shoda et al. | |
| 2006/0130306 A1 | 6/2006 | Keller | |
| 2009/0181779 A1 | 7/2009 | Wagner et al. | |

FOREIGN PATENT DOCUMENTS

| | | |
|---|---|---|
| GB | 2042126 A | 9/1980 |
| JP | A-2007-177955 | 7/2007 |
| JP | A-2009-35584 | 2/2009 |
| JP | A-2009-107415 | 5/2009 |
| WO | WO 2007043637 A1 | 4/2007 |

* cited by examiner

METHOD OF REMOVING BULGING PORTIONS TO MANUFACTURE A FRICTION WELDED PROPELLER SHAFT

INCORPORATION BY REFERENCE

This is a Divisional of application Ser. No. 12/959,660, filed Dec. 3, 2010, and claims priority to Japanese Patent Application No. 2009-280782 filed on Dec. 10, 2009. The prior applications, including the specifications, drawings and abstract are incorporated herein by reference in their entirety.

BACKGROUND OF THE INVENTION

1. Field of the Invention

The invention relates to a propeller shaft used as a driving force transmitting shaft portion of a vehicle.

2. Description of the Related Art

Japanese Patent Application Publication No. 2007-177955 (JP-A-2007-177955) and Japanese Patent Application Publication No. 2009-107415 (JP-A-2009-107415), for example, describe a conventional propeller shaft. This propeller shaft is arranged between a transmission that is connected to a power unit, and a differential gear that is connected to wheels. The propeller shaft transmits output from the transmission to the differential gear. The position of the transmission relative to the differential gear changes according to impacts from the road surface and the operating state of the vehicle and the like. Therefore, in order to absorb relative displacement of these devices in the longitudinal direction of the vehicle in particular, the propeller shaft is formed of a first shaft having male splines and a second shaft having female splines. The male splines and the female splines are formed so as to be slidable relative to each other in the axial direction (i.e., the longitudinal direction of the vehicle).

With this kind of propeller shaft, the slide resistance between the male splines and the female splines is large. A phenomenon known as stick-slip may occur due to relative movement between the transmission and the differential when the vehicle is accelerating or decelerating or the like. Stick-slip is a phenomenon in which the male splines of the first shaft and the female splines of the second shaft intermittently slide relative to each other in the axial direction.

Therefore, JP-A-2007-177955 describes coating the sliding surfaces of the male splines and the female splines with a solid lubrication film of diamond-like carbon (hereinafter also referred to as "DLC") or the like in order to reduce the occurrence of stick-slip.

This DLC film is described in Japanese Patent Application Publication No, 2009-35584 (JP-A-2009-35584), for example. The DLC film is formed on the surface of a substrate using any of a variety of known film forming methods such as a plasma Chemical Vapor Deposition (CVD) method or a Physical Vapor Deposition (PVD) method such as a vacuum deposition method. Among these film forming methods, a direct-current plasma CVD method is generally well used because the film forming conditions are easy to control.

SUMMARY OF THE INVENTION

It is an object of this invention to provide a propeller shaft with which the cost of surface treatment applied to reduce the occurrence of stick-slip is lowered.

One aspect of the invention relates to a propeller shaft that includes a first shaft having a yoke at one end, a second shaft slidably connected to the other end of the first shaft, and a surface treated member which is arranged at a connecting portion, at which the first shaft and the second shaft are connected to each other, and to which surface treatment for improving slidability of the second shaft with respect to the first shaft is applied. The surface treated member is formed of a substrate which is separate from the first shaft and the second shaft and to which the surface treatment is applied. The surface treated member is arranged at the connecting portion, at which the first shaft and the second shaft are connected to each other, after the surface treatment has been applied.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, propeller shafts according to example embodiments of the invention will be described with reference to the accompanying drawings.

Figure 1:
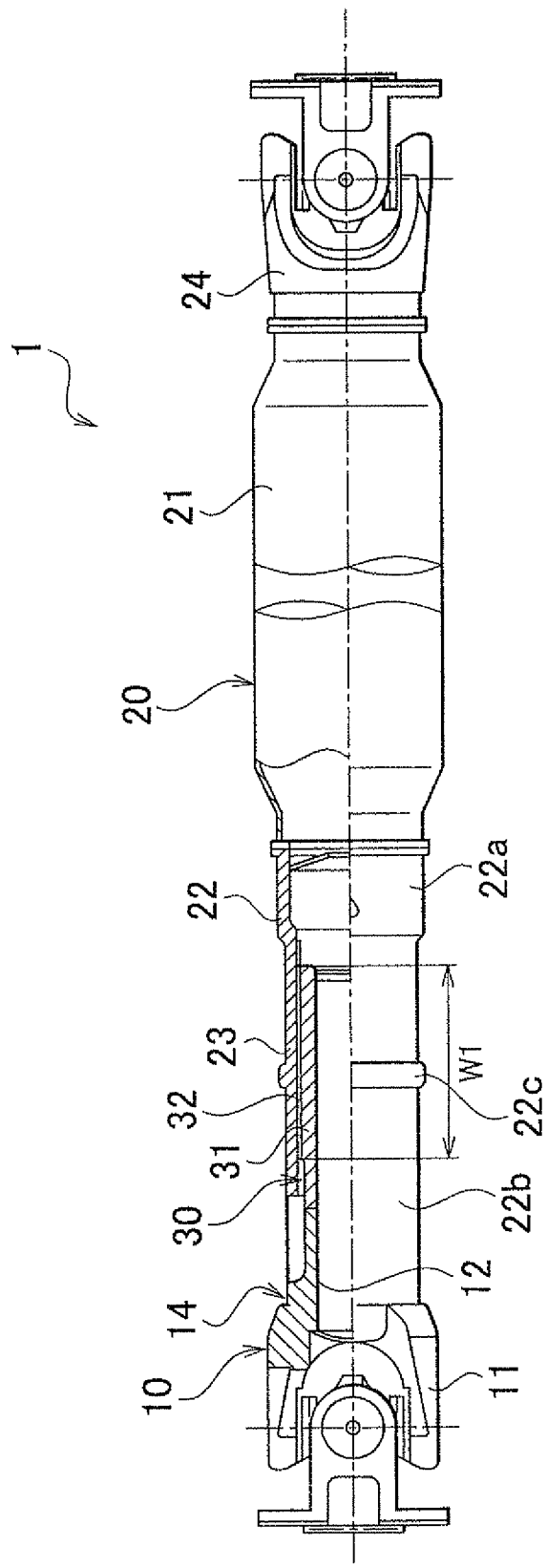
FIG. 1 is a front partial sectional view of a propeller shaft according to a first example embodiment of the invention.
Figure 2:
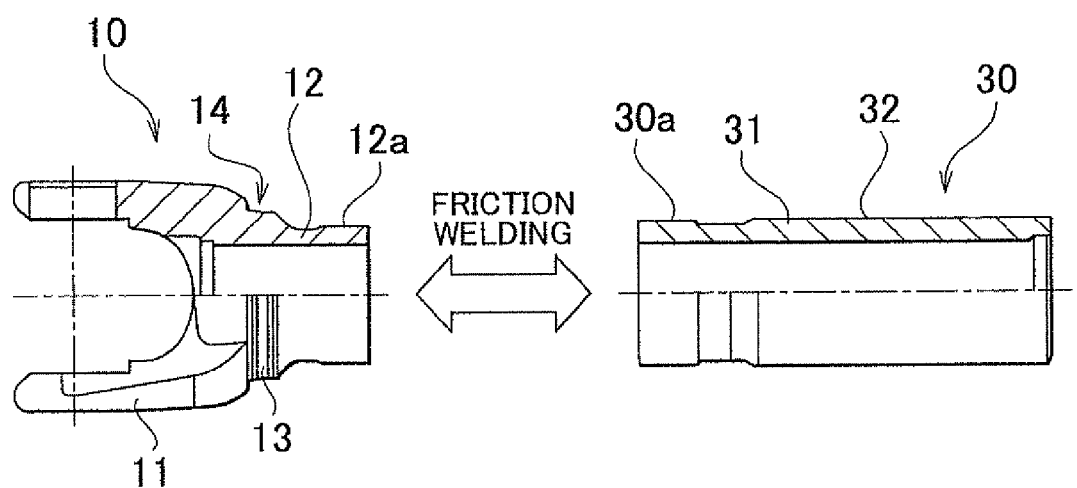
FIG. 2 is a view of a state in which a first shaft and a surface treated member are to be joined by friction welding according to the first example embodiment.
Figure 3:
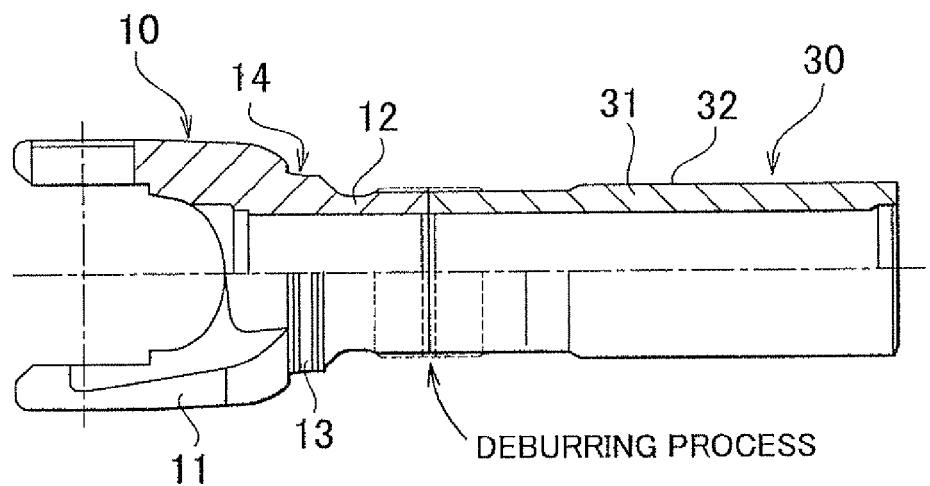
FIG. 3 is a front partial sectional view of the first shaft and the surface treated member that have been integrated by friction welding according to the first example embodiment.

Hereafter, a first example embodiment will be described. A propeller shaft according to the first example embodiment will be described with reference to FIGS. 1 to 3. FIG. 1 is a front partial sectional view of a propeller shaft 1 according to the first example embodiment. In FIG. 1, the left side portion above the shaft axis is shown in a sectional view. FIG. 2 is a view of a state in which a first shaft and a surface treated member are to be joined by friction welding. FIG. 3 is a front partial sectional view of the first shaft and the surface treated member that have been integrated by friction welding. Note that, in the following description, unless otherwise stated, "right" refers to the right in FIG. 1 and "left" refers to the left in FIG. 1.

The propeller shaft 1 is a shaft for transmitting power from an engine to a differential unit. This propeller shaft 1 may be a front propeller shaft or a rear propeller shaft depending on the drive system. In either case, the propeller shaft connects the engine to the differential unit and is arranged extending in the longitudinal direction of the vehicle.

The propeller shaft 1 in this example embodiment has a first shaft 10 that has male splines (hereinafter referred to as "second splines") 31 and a second shaft 20 that has female splines (hereinafter referred to as "first splines") 23, as shown in FIG. 1. The second shaft 20 is arranged so as to be slidable in the axial direction with respect to the first shaft 10. A surface treated member 30 is fixed to the first shaft 10 by friction welding.

The first shaft 10 has a first joint portion 11 that forms a yoke of a universal joint, and a cylindrical portion 12 that is integrally formed with a bottom portion (i.e., the right end) of the first joint portion 11 and arranged coaxially with the shaft axis. A seal portion 14 is provided on the outer peripheral surface of the first joint portion 11-side end portion (i.e., the left end portion) of the cylindrical portion 12. The seal portion 14 has a ring-shaped groove 13 formed in the outer peripheral surface of the cylindrical portion 12, and a seal rubber (not shown) fitted into the groove 13.

The second shaft 20 has a first tube portion 21 positioned in a center portion in the axial direction (hereinafter simply referred to as the "axial center portion"), a second tube portion 22 that is coupled to a left end surface of the first tube portion 21, first splines 23, and a second joint portion 24 that is coupled to a right end surface of the first tube portion 21.

The first tube portion 21 is formed in a cylindrical shape and has a large diameter portion with a diameter larger than the diameters of both end portions, at the axial center portion. The second tube portion 22 is also formed in a cylindrical shape, and the end surface of a right side end portion 22a of this second tube portion 22 is coupled by friction welding to the end surface a left side end portion of the first tube portion 21. The left side end portion of the first tube portion 21 is formed in the same diameter as the right side end portion 22a of the second tube portion 22. The majority of the left side portion of the second tube portion 22, excluding the right side end portion 22a, is a small diameter cylindrical portion 22b that has an outer diameter smaller than that of the right side end portion 22a. The outer peripheral surface of the small diameter cylindrical portion 22b is formed such that the outer diameter of the small diameter cylindrical portion 22b is constant in the axial direction. A balance weight portion 22e is formed in substantially the center portion of the small diameter cylindrical portion 22b in the axial direction.

The left end portion of this small diameter cylindrical portion 22b is fitted to the seal portion 14 provided on the outer peripheral surface of the cylindrical portion 12 of the first shaft 10. That is, the small diameter cylindrical portion 22b is arranged in a state in which the inner peripheral surface of the small diameter cylindrical portion 22b abuts against the outer peripheral surface of the seal rubber of the seal portion 14. As a result, a seal function is exhibited by the seal rubber sliding on the outer peripheral surface of the cylindrical portion 12 of the first shaft 10 when the first shaft 10 and the second shaft 20 slide relative to each other in the axial direction.

The first splines 23 are integrally formed in the inner peripheral surface of the small diameter cylindrical portion 22b of the second tube portion 22. These first splines 23 are formed, from the axial center portion toward the right side end, in the inner peripheral surface of the small diameter cylindrical portion 22b. The area in which the first splines 23 are formed is larger in the axial direction than an area W1 in which the second splines 31 are formed in the outer peripheral surface of the surface treated member 30.

The second joint portion 24 forms a yoke of a universal joint and is joined to a right end surface of the first tube portion 21 by friction welding.

The surface treated member 30 is formed in a cylindrical shape having the same inner diameter as the cylindrical portion 12 of the first shaft 10. The left end surface of the surface treated member 30 is joined to the right end surface of the cylindrical portion 12 by friction welding. The second splines 31 are integrally formed in the outer peripheral surface of the majority of the right side portion of the surface treated member 30, excluding the left side end portion. Note, the area in which the second splines 31 are formed in the axial direction in the surface treated member 30 is denoted by reference character W1, and is shorter than the area in which the first splines 23 are formed in the axial direction. The tip diameter of the second splines 31 is substantially the same as the root diameter of the first splines 23, and the root diameter of the second splines 31 is substantially the same as the tip diameter of the first splines 23. Also, these second splines 31 are arranged so as to axially slidably engage with the first splines 23. As a result, the first shaft 10 and the second shaft 20 are axially slidably connected together by the second splines 31 being engaged with the first splines 23.

A DLC film (i.e., a solid lubrication film) 32 is formed on the surface portion of the second splines 31 of the surface treated member 30 by a conventionally known direct-current plasma CVD method in order to reduce stick-slip that tends to occur when the second splines 31 slide against the first splines 23. With this example embodiment, the DLC film 32 is formed on an independent substrate that is separate from the first shaft 10, before the surface treated member 30 is joined to the first shaft 10 by friction welding.

In this example embodiment, first, a substrate having a predetermined shape that forms the second splines 31 is prepared as the surface treated member 30. Here, the prepared substrate has a bulging portion 30a with a diameter that is larger than the outer diameter when the part is finished, on an end portion in the axial direction (hereinafter simply referred to as "axial end portion") that is joined to the first shaft 10 by friction welding after the surface treatment is complete, as shown in FIG. 2. An axial end portion of the first shaft 10 that is joined to the surface treated member 30 has a similar bulging portion 12a. That is, the bulging portions 30a and 12a that have diameters that are larger than the outer diameter when the part is finished are formed on the axial end portions of the substrate (i.e., the surface treated member 30) and the first shaft 10, respectively. Note that, these bulging portions 30a and 12a are removed together with burr produced by friction welding, during a deburring process that is applied after friction welding.

Next, the surface of the portion other than the portion where the DLC film 32 is formed (i.e., other than the sliding surface of the second splines 31) is masked, and the substrate is placed inside a plasma reaction chamber that is used as a treatment furnace. At this time, the substrate to which the surface treatment is applied is approximately the same size as the first shaft 10, and therefore approximately one-half the size of a member formed by integrating the surface treated member 30 and the first shaft 10 with each other. Therefore, a large number, i.e., approximately twice the conventional number, of substrates are able to be placed inside the plasma reaction chamber, so surface treatment is able to be applied to even more substrates at once.

Then, a chemical vapor deposition process is performed by applying a voltage of several hundred volts and continuously discharging direct current for a predetermined period of time between a positive electrode and a negative electrode provided inside the plasma reaction chamber, in a state where the pressure in the plasma reaction chamber is a predetermined pressure and the atmosphere in the plasma reaction chamber is the gas atmosphere. As a result, the DLC film 32 with a film thickness of approximately 5±4 μm is formed on the surface of the second splines 31 of the substrate.

After the surface treatment of the surface treated member 30 is finished in this way, the surface treated member 30 and the first shaft 10 are friction pressure welded using a known friction welding machine, as shown in FIG. 2. As a result, the axial end surfaces of these are joined together. At this time, burr protruding radially outward is produced at the joint as a result of the friction welding of the surface treated member 30 and the first shaft 10. A deburring process according to a turning process or the like is applied after friction welding is finished (see the broken line portion in FIG. 3). In this deburring process, the bulging portions 30a and 12a formed on the axial end portions of the surface treated member 30 and the first shaft 10, respectively, are removed together with burr produced by the friction welding.

The surface treated member 30 of the propeller shaft 1 of this example embodiment structured as described above is formed of a member that is separate from the first shaft 10 and the second shaft 20. The surface treatment that is applied to reduce the occurrence of stick-slip is applied only to the surface treated member 30. Therefore, the volume of the surface treated member 30 can be reduced, which makes it possible to fit more substrates inside the treatment furnace when applying the surface treatment of the surface treated members 30. As a result, the surface treatment can be applied to even more surface treated members 30 at once, so treatment efficiency can be improved, which enables the surface treatment cost to be significantly reduced.

In particular, in this example embodiment, the surface treatment applied to the surface treated member 30 employs a direct-current plasma CVD method that is performed with the substrate with the surface on which the DLC film 32 is to be formed placed inside a plasma reaction chamber that serves as the treatment furnace. Accordingly, more substrates can be placed inside the plasma reaction chamber. Thus, the DLC film 32 can be efficiently formed on more substrates at once, so a more significant reduction in the surface treatment cost can be achieved.

In this example embodiment, the first shaft 10 and the second shaft 20 are connected by engaging the second splines 31 formed in the surface treated member 30 with the first splines 23 formed in the second shaft 20. Accordingly, the size of the surface treated member 30 can be reduced to a size that approximately corresponds to the length of the second splines 31. As a result, treatment efficiency of the surface treatment can be improved, so the surface treatment cost can be significantly reduced.

In this example embodiment, the surface treated member 30 and the first shaft 10 are joined together at the axial end surfaces by friction welding. Therefore, the surface treated member 30 and the first shaft 10 are strongly coupled together. Also, the axis of the surface treated member 30 and the axis of the first shaft 10 are aligned with each other relatively easily by appropriately controlling the conditions of the friction welding.

In this example embodiment, before the friction welding, the axial end portions of the surface treated member 30 and the seat portion 10, which are joined together by friction welding, have the bulging portions 30a and 12a that have diameters that are larger than the outer diameter when the part is finished. The bulging portions 30a and 12a are removed together with burr produced by the friction welding, during the deburring process that is applied after friction welding. Therefore, large friction welding surfaces of the surface treated member 30 and the first shaft 10 are ensured during friction welding. As a result, the surface treated member 30 and the first shaft 10 are more strongly joined together.

Note that, in this example embodiment, the surface treated member 30 is connected to the first shaft 10, but it may also be structured to be connected to the second shaft 20. Also, in this example embodiment, the first splines 23 that are female splines are formed in the second shaft 20, and the second splines 31 that are male splines are formed in the surface treated member 30. However, female splines may be formed in the surface treated member 30 and male splines may be formed in the second shaft 20.

Figure 4A:
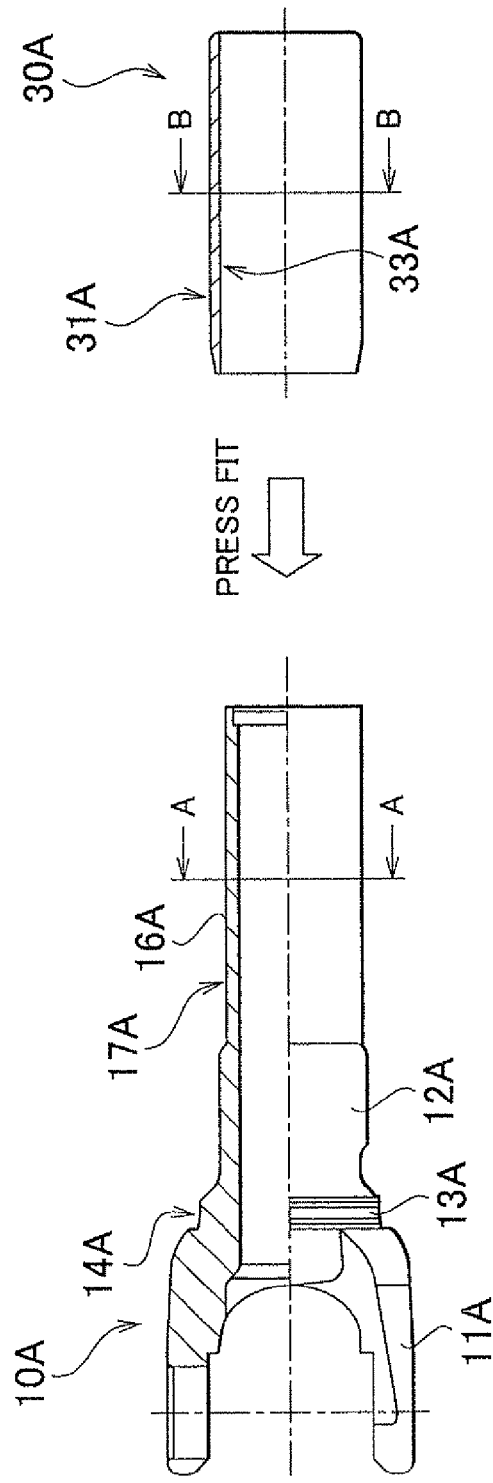
FIG. 4A is a view of a state in which a first shaft and a surface treated member are fixed together by press fitting according to a second example embodiment.
Figure 4C:
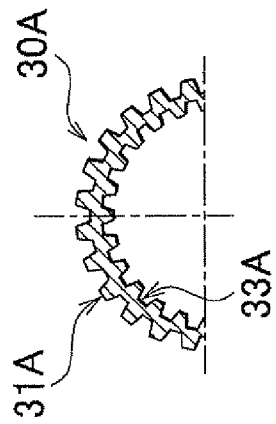
FIG. 4C is a partial sectional view taken along the line B-B in FIG. 4A.
Figure 4B:
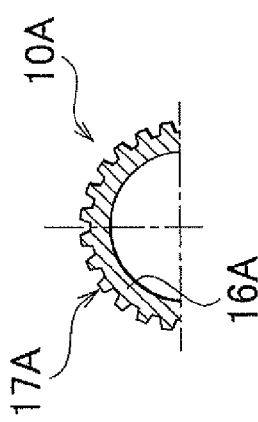
FIG. 4B is a partial sectional view taken along the line A-A in FIG. 4A.
Figure 5:
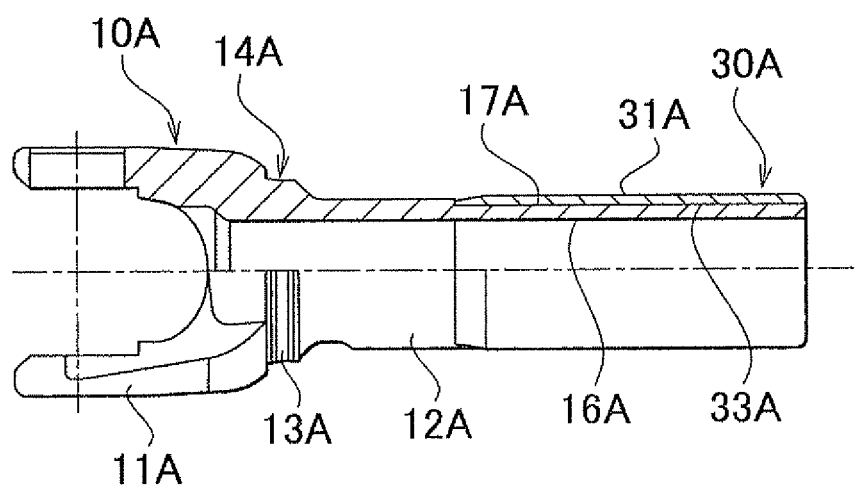
FIG. 5 is a front partial sectional view of the first shaft and the surface treated member that have been integrated by press fitting according to the second example embodiment.

Hereafter, a second embodiment of the invention will be described. A propeller shaft according to a second example embodiment will now be described with reference to FIGS. 4 and 5. FIG. 4A is a view of a state in which a first shaft and a surface treated member are to be fixed together by press fitting according to the second example embodiment. FIG. 4B is a partial sectional view taken along the line A-A in FIG. 4A. FIG. 4C is a partial sectional view taken along the line B-B in FIG. 4A. FIG. 5 is a front partial sectional view of the first shaft and the surface treated member that have been integrated by press fitting according to the second example embodiment.

With the propeller shaft according to the first example embodiment, the surface treated member 30 and the first shaft 10 are joined together at the axial end surfaces by friction welding. The propeller shaft according the second example embodiment differs from the propeller shaft according to the first example embodiment in that a surface treated member 30A and a first shaft 10A are fixed together by being press fit in the axial direction. Therefore, structure and members that are the same as those in the first example embodiment will be denoted by the same reference characters as those in the first example embodiment, and detailed descriptions thereof will be omitted. The following description will focus on the differences.

The first shaft 10A of the second example embodiment has a first joint portion 11A that forms a yoke of a universal joint, and a cylindrical portion 12A that is integrally formed with a bottom portion (i.e., the right end) of the first joint portion 11A and arranged coaxially with the shaft axis.

The first joint portion 11A is the same as the first joint portion 11 of the first example embodiment. The left side end portion of the cylindrical portion 12A has a seal portion 14A formed of a groove 13A and a seal rubber (not shown), as in the cylindrical portion 12 of the first example embodiment. This cylindrical portion 12A is longer in the axial direction than the cylindrical portion 12 of the first example embodiment. That is, the cylindrical portion 12A is longer than the cylindrical portion 12 by the axial length of the surface treated member 30 that has been joined to the right side end surface of the cylindrical portion 12 in the first example embodiment. Accordingly, the axial length of the first shaft 10A is approximately the same as the axial length of the member formed by integrating the first shaft 10 and the surface treated member 30 with each other by friction welding in the first example embodiment.

A fit portion 16A, to which the surface treated member 30A is fitted, is formed in a portion of the cylindrical portion 12A, which extends from substantially the axial center to the right end of the cylindrical portion 12A. This fit portion 16A has an inner diameter that is the same as the inner diameter of the left side portion of the cylindrical portion 12A, and has an outer diameter that is smaller than the outer diameter of the left side portion. Fourth splines 17A that are male splines are formed in the outer peripheral surface of the fit portion 16A, as shown in FIG. 4B.

The surface treated member 30A is formed in a cylindrical shape and has substantially the same length as the axial length of the fit portion 16A of the cylindrical portion 12A. Third splines 33A that are female splines are formed in the inner peripheral surface of the surface treated member 30A, as shown in FIG. 4C. The tip diameter of the third splines 33A is slightly smaller than the root diameter of the fourth splines 17A, and the root diameter of the third splines 33A is slightly smaller than the tip diameter of the fourth splines 17A. As a result, as shown in FIG. 4A, when the surface treated member 30A is press fit in the axial direction onto the outer peripheral side of the fit portion 16A of the cylindrical portion 12A, the third splines 33A engage with the fourth splines 17A. Accordingly, relative movements between the surface treated member 30A and the cylindrical portion 12A in the axial direction and the circumferential direction are strongly restricted.

Also, second splines 31A that are similar to the second splines 31 in the first example embodiment are formed along the entire length in the axial direction in the outer peripheral surface of the surface treated member 30A. A DLC film 32A with a film thickness of approximately 5±4 μm is formed on the surface of these second splines 31A by applying a surface treatment to the surface of the second splines 31A, which is similar to the surface treatment applied to the surface of the second splines 31 in the first example embodiment. These second splines 31A engage with first splines (not shown) formed in a second shaft (not shown), as in the first example embodiment. As a result, the first shaft 10A and the second shaft are axially slidably connected together by the second splines 31A being engaged with the first splines.

In the propeller shaft of this example embodiment structured as described above, the surface treated member 30A and the first shaft 10A are fixed together by press fitting in the axial direction. Accordingly, the surface treated member 30A and the first shaft 10A are integrated by being strongly fixed together. In this case, the surface treated member 30A is fixed to the first shaft 10A by being axially press fit onto the first shaft 10A. As a result, the axis of the surface treated member 30A and the axis of the first shaft 10A are easily aligned with each other.

In this example embodiment, the surface treated member 30A has the third splines 33A in one of the inner peripheral surface and the outer peripheral surface while having the second splines 31A in the other of the inner peripheral surface and the outer peripheral surface, and the first shaft 10A has the fourth splines 17A. The surface treated member 30A and the first shaft 10A are fixed together by engaging the third splines 33A with the fourth splines 17A. Therefore, the surface treated member 30A and the first shaft 10A are fixed together by both press fitting and spline-engagement, so the surface treated member 30A and the first shaft 10A are strongly fixed together without slipping out of position even when torque is transmitted.

In this example embodiment, the fourth splines 17A that engage with the third splines 33A are formed in the first shaft 10A, but the fourth splines 17A may also be formed in the second shaft 20. The third splines 33A are formed in the inner peripheral surface on the side opposite the second splines 31A that are formed in the outer peripheral surface of the surface treated member 30A. If the second splines 31A are formed in the inner peripheral surface of the surface treated member 30A, then the third splines 33A are formed in the outer peripheral surface of the surface treated member 30A.

Figure 6:
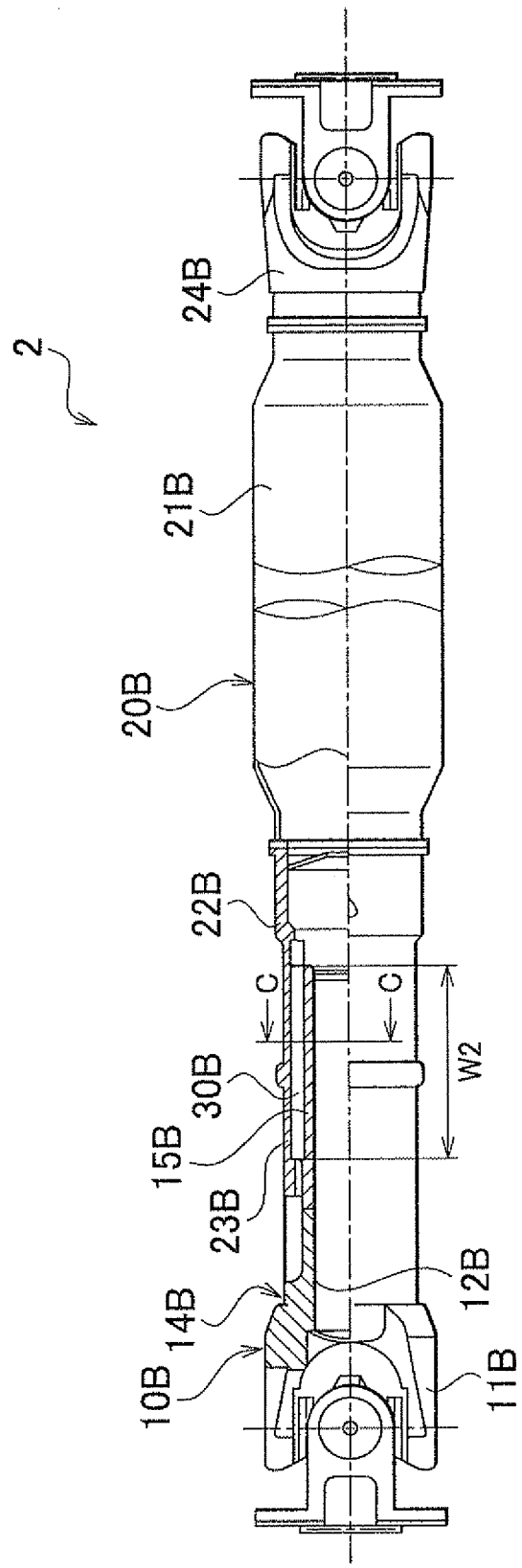
FIG. 6 is a front partial sectional view of a propeller shaft according to a third example embodiment.
Figure 7:
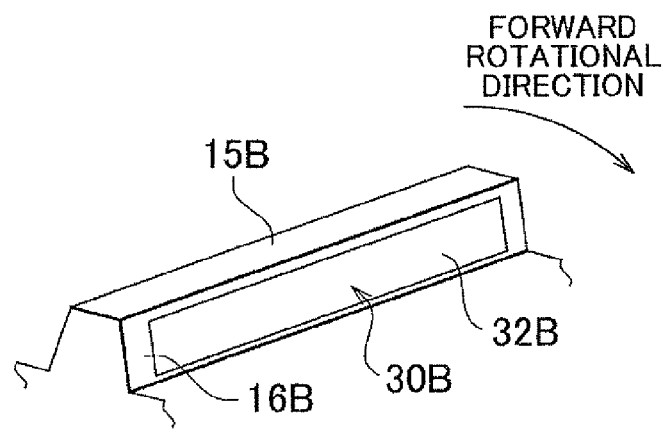
FIG. 7 is a perspective view of a surface treated member arranged at a portion corresponding to line C-C in FIG. 6.

Hereafter, a third example embodiment will be described. A propeller shaft 2 according to a third example embodiment will now be described with reference to FIGS. 6 and 7. FIG. 6 is a front partial sectional view of the propeller shaft according to the third example embodiment. FIG. 7 is a perspective view of a surface treated member arranged at a portion corresponding to the line C-C in FIG. 6.

The propeller shaft 2 in this example embodiment has a first shaft 10B with fifth splines 15B, a second shaft 20B with sixth splines 23B, and a surface treated member 30B that is formed in a plate shape and arranged on sliding surfaces of the first shaft 10B and the second shaft 20B, as shown in FIGS. 6 and 7.

The first shaft 10B has a first joint portion 11B and a cylindrical portion 12B, as in the first example embodiment. The first joint portion 11B is formed in a manner similar to that in which the first joint portion 11 in the first example embodiment is formed. The cylindrical portion 12B has substantially the same length in the axial direction as the cylindrical portion 12A of the second example embodiment. A seal portion 14B formed of a groove and a seal rubber (neither of which is shown) is provided on the outer peripheral surface of the first joint portion 11B-side end portion (i.e., the left end portion) of the cylindrical portion 12B, as in the first example embodiment.

The fifth splines 15B that are structured like the second splines 31 formed in the outer peripheral surface of the surface treated member 30 in the first example embodiment are formed in the outer peripheral surface of a portion of the cylindrical portion 12B, which extends from substantially the axial center to the right end of the cylindrical portion 12B. However, the DLC film 32 that is formed on the surface of the second splines 31 is not formed on the surface of the fifth splines 15B. The area in which the fifth splines 15B are formed in the axial direction on the first shaft 10B is denoted by reference character W2, and is shorter than the area in which the sixth splines 23B are formed in the axial direction.

The second shaft 20B is structured like the second shaft 20 of the first example embodiment, and has a first tube portion 21B, a second tube portion 22B, sixth splines 23B, and a second joint portion 24B. The sixth splines 23B of the third example embodiment correspond to the first splines 23 of the first example embodiment. The tip diameter of these sixth splines 23B is substantially the same as the root diameter of the fifth splines 15B, and the root diameter of these sixth splines 23B is substantially the same as the tip diameter of the fifth splines 15B. Also, these sixth splines 23B are arranged so as to axially slidably engage with the fifth splines 15B. As a result, the first shaft 10B and the second shaft 20B are axially slidably connected together by the fifth splines 15B being engaged with the sixth splines 23B.

The structure other than the sixth splines 23B of the second shaft 20B is the same as that in the first example embodiment, so a description thereof will be omitted.

The surface treated member 30B is formed in a plate shape of a predetermined thickness (approximately 0.01 to 0.2 mm). Surface treatment similar to the surface treatment applied to the surface treated member 30 of the first example embodiment is applied to one surface of the surface treated member 30B. That is, a DLC film 32B with a film thickness of 5±4 μm is formed on one surface of the surface treated member 30B. This surface treated member 30B is arranged on sliding surfaces of the fifth splines 15B and the sixth splines 23B.

In this example embodiment, as shown in FIG. 7, the other surface of the surface treated member 30B (i.e., the surface on which the DLC film 32B is not formed) is adhered by an adhesive to a positive torque load surface 16B that is toward the front, with respect to forward rotation, of each of the teeth of the fifth splines 15B. In this case, the surface treated member 30B is formed in a rectangle that is smaller than the positive torque load surface 16B, and is arranged only at a center portion that excludes the outer peripheral edge portion of the positive torque load surface 16B. As a result, the surface (i.e., the one surface) of the surface treated member 30B, on which the DLC film 32B is formed, faces a positive torque load surface (not shown) of the sixth splines 23B that face the positive torque load surface 16B of the fifth splines 15B. As a result, good slidability in the axial direction between the fifth splines 15B and the sixth splines 23B is ensured.

In the propeller shaft 2 of the third example embodiment structured as described above, the surface treated member 30B is formed in a plate shape and arranged on the sliding surfaces of the fifth splines 15B and the sixth splines 23B. Therefore, because the surface treated member 30B need only be formed in a plate shape of a size that approximately corresponds to each of the sliding surfaces of the fifth splines 15B and the sixth splines 23B, the surface treated member 30B can be made extremely small. Thus, treatment efficiency when applying the surface treatment for forming the DLC film 32B to the surface of the substrate is even further improved, so more significant reductions in the surface treatment cost and the logistics cost can be achieved.

Also, in the third example embodiment, the surface treated member 30B is adhered to the positive torque load surface 16B of the sliding surface of the fifth splines 15B. As a result, stick-slip that tends to occur at the positive torque load surfaces of the sliding surfaces of the fifth splines 15B and the sixth splines 23B is effectively reduced.

In the third example embodiment, the surface treated member 30B is adhered to the sliding surface of each of the fifth splines 15B. Alternatively, the surface treated member 30B may be adhered to the sliding surface of each of the sixth splines 23B.

Figure 8:
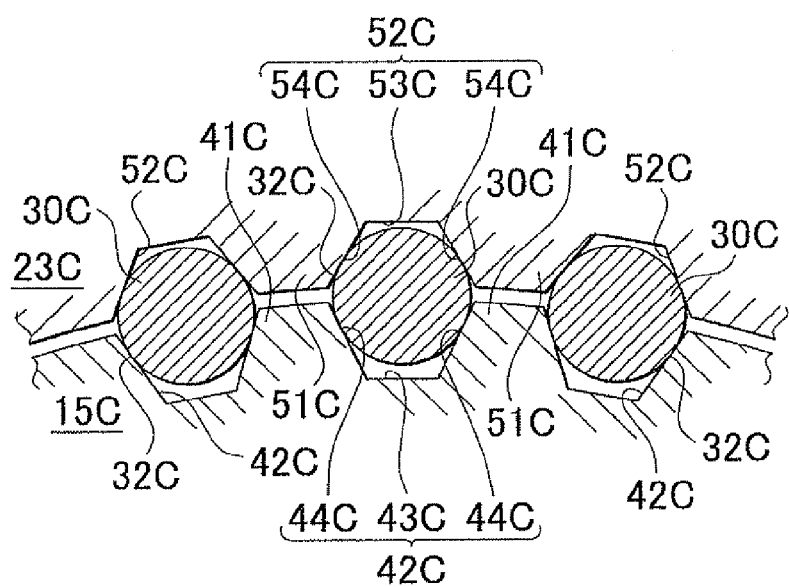
FIG. 8 is a sectional view of a main portion of a propeller shaft according to a fourth example embodiment.

A fourth embodiment of the invention will be described. Next, a propeller shaft according to a fourth example embodiment will be described with reference to FIG. 8. FIG. 8 is a sectional view of a main portion (i.e., a portion corresponding to line C-C in FIG. 6) of the propeller shaft according to the fourth example embodiment.

In the propeller shaft according to the third example embodiment, the surface treated member 30B formed in a plate shape is adhered to either the sliding surface of each of the fifth splines 15B or the sliding surface of each of the sixth splines 23B. In contrast, in the propeller shaft according to the fourth example embodiment, a surface treated member 30C formed in a round bar shape is arranged, so as to be able to transmit torque, between a surface of seventh splines 15C formed in a first shaft (not shown) and a surface of eighth splines 23C formed in a second shaft (not shown). The fourth embodiment differs from the third example embodiment in this point, and this difference will hereinafter be described.

In the fourth example embodiment, the seventh splines 15C and the eighth splines 23C are arranged such that projections 41C and 51C face one another in the radial direction and recesses 42C and 52C face one another in the radial direction. The recesses 42C and 52C are formed such that their widths gradually increase from the bottom side toward the open side. Accordingly, a space 40C that extends in the axial direction and has a generally hexagonal cross section is formed at a portion where the recesses 42C and 52C face one another. At two recesses 42C and 52C that define the space 40C, the distance between bottom surfaces 43C and 53C that face one other while the recesses 42C and 52C are substantially parallel is greater than the distance between side faces (i.e., torque transmitting surfaces) 44C and 54C that face one another while the recesses 42C and 52C are parallel.

Also, the long surface treated member 30C that has a circular cross section and is formed so as to be approximately the same length as the axial lengths of the seventh splines 15C and the eighth splines 23C is arranged in each space 40C. In this case, the surface treated member 30C is arranged in a state in which the outer peripheral surface thereof contacts the side faces 44C and 54C that face one another while the recesses 42C and 52C that define the space 40C are parallel. A DLC 32C with a film thickness of approximately 5±4 μm is formed on the surface of this surface treated member 30C by applying a surface treatment to the surface of this surface treated member 30C, which is similar to the surface treatment applied to the surface treated member 30 of the first example embodiment.

In the propeller shaft of the fourth example embodiment structured as described above, the surface treated member 30C is arranged between the side faces 44C and 54C (i.e., the torque transmitting surfaces) of the opposing recesses 42C and 52C of the seventh splines 15C and the eighth splines 23C. Therefore, appropriate dimensions between the opposing torque transmitting surfaces 44C and 54C of the seventh splines 15C and the eighth splines 23C is ensured by appropriately setting the diameter of the surface treated member 30C. Also, arranging the surface treated member 30C in the space 40C defined and formed by the torque transmitting surfaces 44C and 54C make it possible to suppress a decrease in the flexural rigidity and durability of the propeller shaft.

Figure 9:
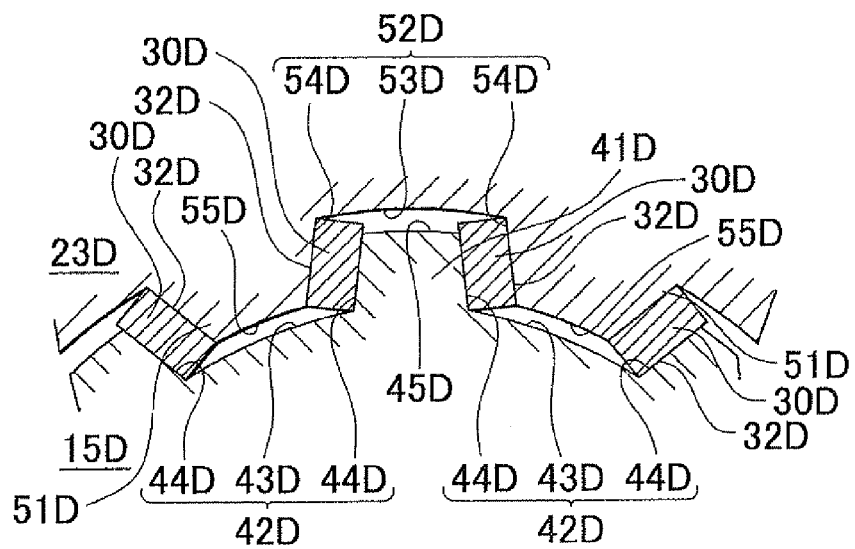
FIG. 9 is a sectional view of a main portion of a propeller shaft according to a first modified example.

Hereafter, a first modified example will be described. FIG. 9 is a sectional view of a main portion of a propeller shaft according to a first modified example of the fourth example embodiment. This first modified example uses a surface treated member 30D with a rectangular cross section instead of the surface treated member 30C with a circular cross section that is used in the fourth example embodiment. In this first modified example, seventh splines 15D and eighth splines 23D have projections 41D and 51D and recesses 42D and 52D. The projections 41D and 51D face the recesses 52D and 42D, respectively, in the radial direction. Also, the seventh splines 15D and the eighth splines 23D are arranged such that the projections 41D and 51D fit inside the recesses 52D and 42D such that a predetermined clearance is left therebetween. In this case, top surfaces 45D and 55D of the projections 41D and 51D and bottom surfaces 53D and 43D of the recesses 52D and 42D face each other with a predetermined clearance left therebetween. Side faces (i.e., torque transmitting surfaces) 44D and 54D of the projections 41D and 51D that are consecutive in the circumferential direction face one another with a predetermined clearance left therebetween.

Also, the long surface treated member 30D that has a rectangular cross section and has approximately the same length as the axial lengths of the seventh splines 15D and the eighth splines 23D is arranged in each space 40D formed between opposing side faces (i.e., torque transmitting surfaces) 44D and 54D of the projections 41D and 51D that are consecutive in the circumferential direction.

The same effects as those described above are obtained with the first modified example structured as described above.

Figure 10:
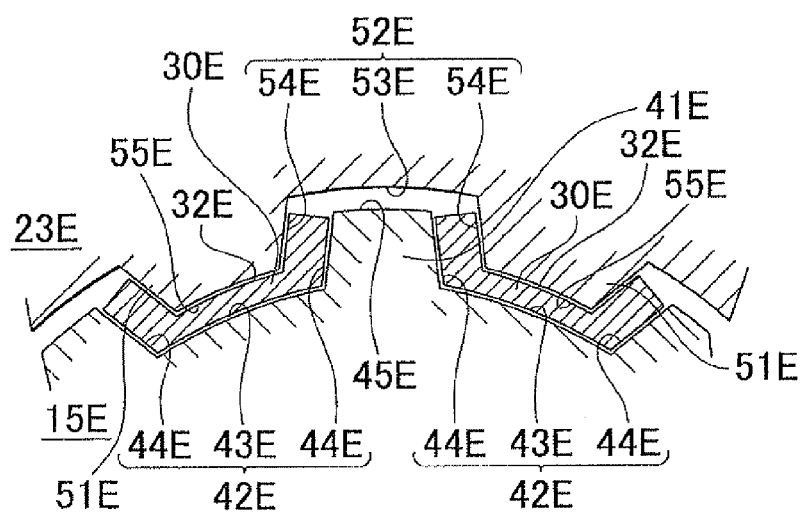
FIG. 10 is a sectional view of a main portion of a propeller shaft according to a second modified example.

Hereafter, a second modified example will be described. FIG. 10 is a sectional view of a main portion of a propeller shaft according to a second modified example of the fourth example embodiment. This second modified example uses a surface treated member 30E with a U-shaped cross section instead of the surface treated member 30D with a rectangular cross section that is used in the first modified example. This surface treated member 30E has a predetermined thickness and is formed to have the same length as the surface treated member 30D of the first modified example. This surface treated member 30E is arranged over a space formed between opposing side faces (i.e., torque transmitting surfaces) 44E and 54E of projections 41E and 51E that are consecutive in the circumferential direction, and a space formed between top surfaces 45E and 55E of the projections 41E and 51E, and bottom surfaces 53E and 43E of recesses 52E and 42E.

The same effects as those described above are obtained with the second modified example structured as described above.

In addition, if serrations are used instead of splines, it is possible to obtain the same effects as those obtained when the splines are used.

What is claimed is:

1. A manufacturing method for a propeller shaft comprising a first shaft having a cylindrical portion joined to a surface treated member and a second shaft which is slidably connected to the first shaft through the surface treated member, the second shaft having first splines, the method comprising steps of:
    forming the surface treated member of a substrate which is separate from the first shaft and the second shaft, wherein the surface treated member has an axial end portion with a bulging portion having a first diameter and a second portion with a second smaller diameter;
    treating a surface of the surface treated member with a surface treatment for improving the slidability of the second shaft with the surface treated member, the surface treated member having second splines to which the treatment is applied;
    forming the first shaft, wherein the cylindrical portion also has an axial end portion with a bulging portion having a first diameter and a second portion with the second smaller diameter;
    joining the surface treated member and the first shaft by friction welding;
    removing the bulging portions together with a burr produced by the friction welding with a deburring process, after the deburring process each of the bulging portions having a second outer diameter equal to the second smaller diameter of the second portions: and
    connecting the surface treated member and the second shaft to each other by slidably engaging the first splines and the second splines with each other.

2. The method according to claim 1, wherein the surface treated member has a solid lubrication film that is formed on a surface of the substrate by a Physical Vapor Deposition method or a Chemical Vapor Deposition method as the surface treatment.

* * * * *